UNITED STATES PATENT OFFICE.

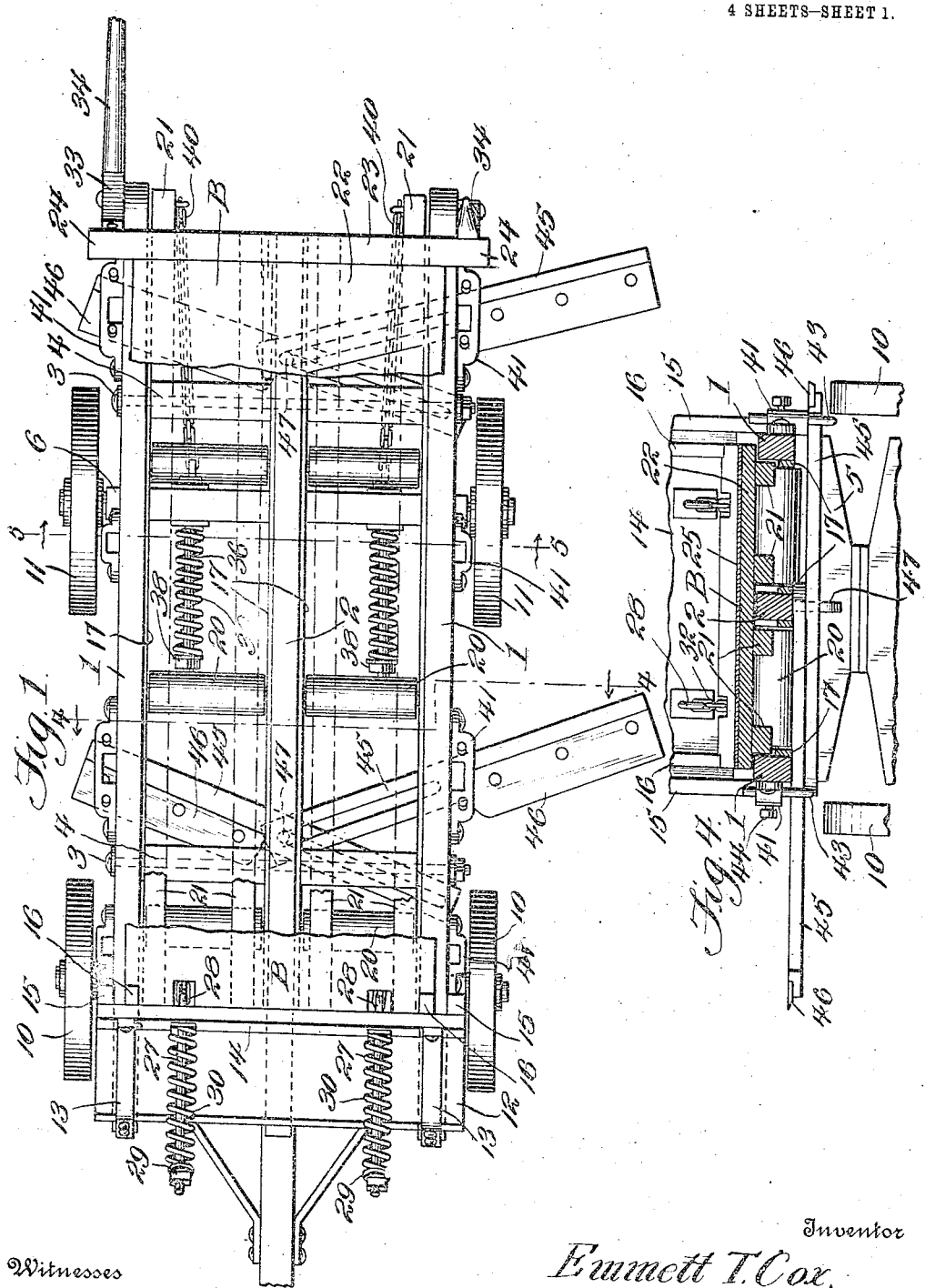

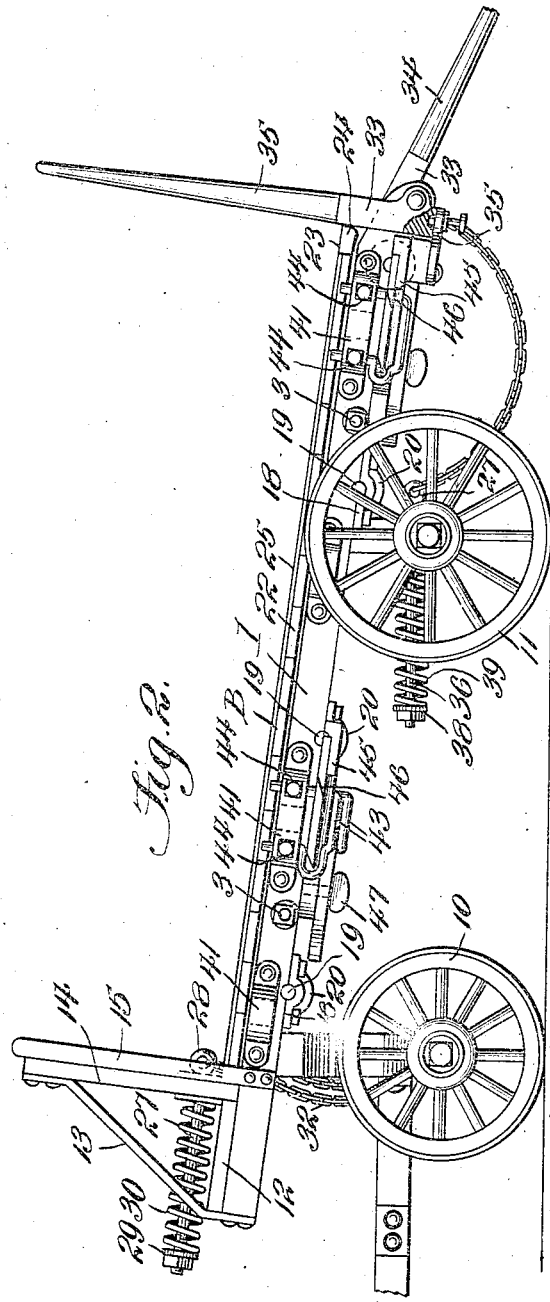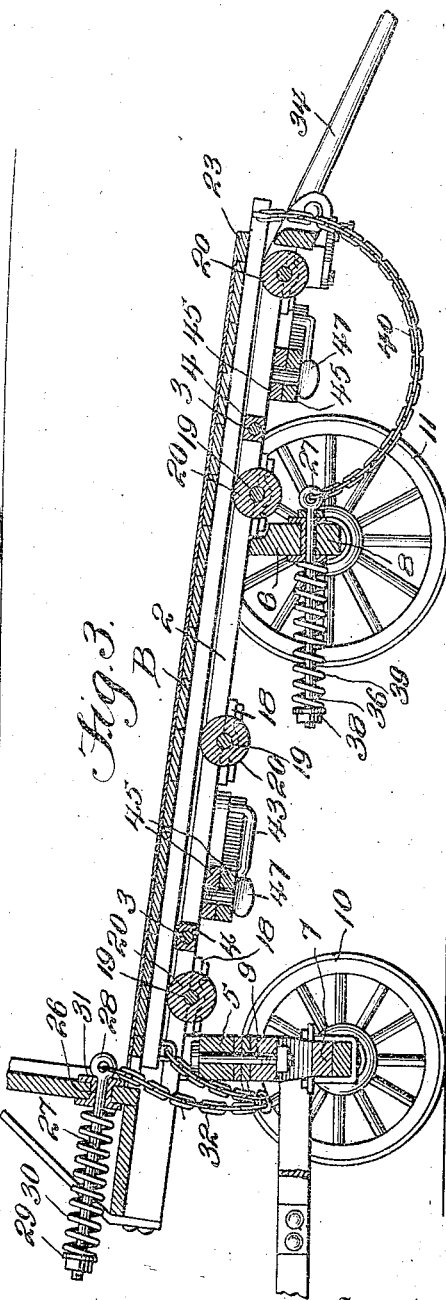

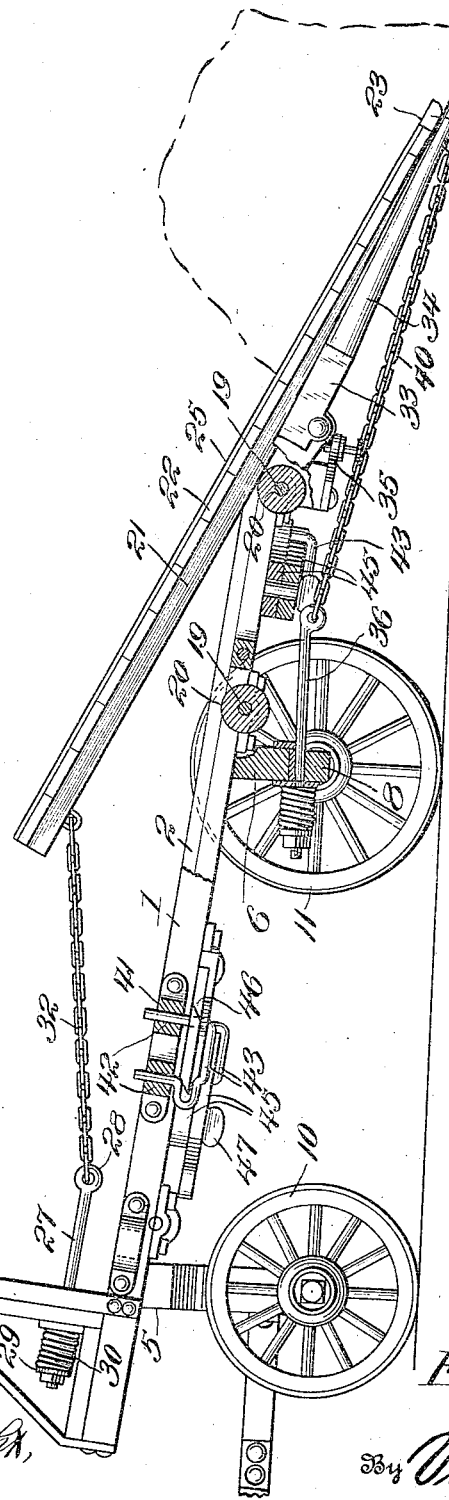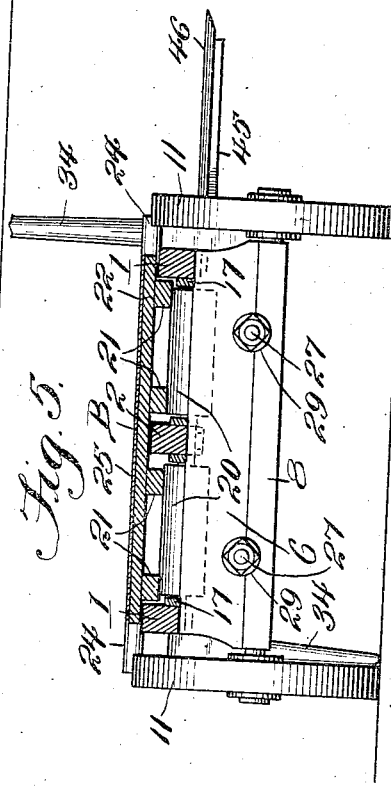

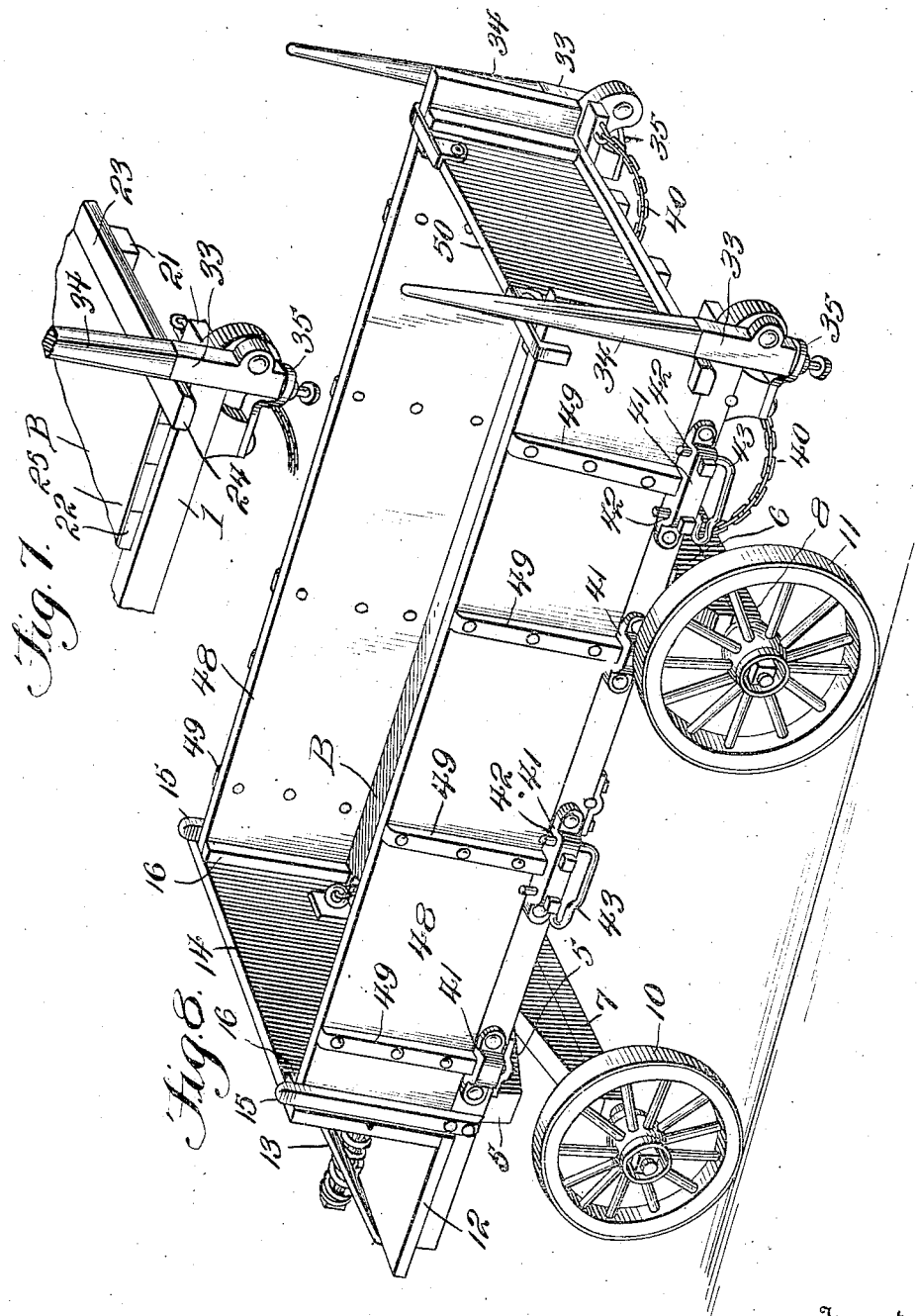

EMMETT T. COX, OF McKENNEY, VIRGINIA.

CORN-HARVESTER.

1,067,644.

Specification of Letters Patent.

Patented July 15, 1913.

Application filed October 4, 1911. Serial No. 652,732.

*To all whom it may concern:*

Be it known that I, EMMETT T. COX, a citizen of the United States, residing at McKenney, in the county of Dinwiddie and State of Virginia, have invented new and useful Improvements in Corn-Harvesters, of which the following is a specification.

This invention relates to corn harvesters, and it has particular reference to that class of harvesters in which is embodied a carrying truck, cutting apparatus associated therewith in such a manner as to enable an operator or operators standing upon the machine to gather the corn stalks as they are being severed and to deposit the same upon the truck, and a movable bottom or supporting member whereby the load may be quickly and conveniently discharged as the machine moves along.

One object of the invention is to provide the truck of the machine with a movably supported bottom platform and retracting means for the same, thereby enabling the load to be discharged very quickly and the bottom or supporting member to be restored without material effort on the part of the operator.

A further object of the invention is to provide a construction whereby the machine when not in use as a corn harvester may be converted into a farm wagon for general use.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a top plan view of a corn harvester constructed in accordance with the invention. Fig. 2 is a side elevation of the same. Fig. 3 is a longitudinal vertical sectional view taken on the line 3—3 in Fig. 1. Fig. 4 is a transverse sectional view taken on the line 4—4 in Fig. 1. Fig. 5 is a transverse sectional view taken on the line 5—5 in Fig. 1. Fig. 6 is a side elevation partly in section, showing the bottom member tilted in the act of discharging a load. Fig. 7 is a perspective detail view showing one of the pivoted socket members and stakes and related parts for retaining the movable bottom member in position. Fig. 8 is a perspective view showing the machine converted into a wagon for general use.

Corresponding parts in the several figures are denoted by like characters of reference.

The frame of the improved machine includes a pair of sills 1, 1 and a longitudinal center bar 2, said sills and center bar being connected together and spaced apart by means of bolts 3 and spacing members 4. The sills and center bar are supported on bolsters 5, 6 mounted upon the front and rear axles 7 and 8, respectively, the front axle being associated with the truck frame by means including a king bolt 9 in such a manner as to facilitate turning, the wheels 10 carried by the front axle being of such height that they will be accommodated beneath the truck frame when the machine is being turned. The wheels 11 upon the rear axle are of relatively small diameter so that the body of the truck frame will incline decidedly in a downward and rearward direction. The running gear may be of any suitable well known and approved construction, the details of which are not specifically claimed.

Supported upon the front ends of the sills and center beam is a foot board 12, the front edge of which is connected by braces 13 with a dashboard 14 provided on its rear face with pairs of cleats 15, 16 which are suitably spaced apart, the lower ends of the cleats 15 being also secured upon the outer faces of the sills 1, while the lower ends of the cleats 16 are supported upon said sills in spaced relation to the cleats 15.

The sills 1 and the longitudinal center beam 2 are provided on their opposed or proximate faces and adjacent to their lower edges with longitudinal flanges 17, and at suitable intervals, the said sills and center bar are provided with bearings 18 for shafts 19 carrying anti-friction rollers 20, the perimeters of which project very slightly above the flanges 17 for the purpose of supporting the movable bottom member of the machine without undue friction. The said bottom member, which is designated by B, comprises in its construction four longitudinal bars 21 which are suitably spaced apart so that two of said bars will fit between each of the sills 1 and the center bar 2, said bars 21 being adapted to ride upon the anti-friction rollers 20 and to be thereby supported and guided between the sills and center bar, as nearly without friction as possible. The longitudinal frame bars 21 support the flooring members 22 and a cross bar 23, which latter, being located near the rear end of the bottom member, extends at both sides so as to form stop members 24, the purpose of which will hereinafter appear. It will be found desirable to protect the flooring 22 with a covering 25 of sheet metal, not only to protect the flooring from wear, but also to provide a perfectly smooth surface over which the load may be readily discharged.

The dashboard 14 is provided with apertures 26 for the passage of rods 27, the rear ends of which have eyes 28 and the front ends of which are provided with heads 29 between which and the front face of the dash springs 30 are interposed whereby the rods 27 are projected in a forward direction, as will be readily understood, the forward movement being limited by the eyes 28 contacting with the rear face of the dashboard. A metallic lining 31 may be provided to reinforce the apertures 26. Flexible members, such as chains 32, connect the front end of the bottom member B with the eyes 28 of the rods 27, the chains being preferably of such length as to be somewhat slack when the bottom member B is at the forward limit of its movement.

Pivotally supported upon the outer faces of the sills 1 adjacent to the rear ends of the latter are socket members 33 in which upwardly extending stakes 34 are supported. Spring actuated or resilient catch members 35 are provided to engage the socket members 33 for the purpose of retaining the latter and the stakes associated therewith normally in an upright position, but it will be seen that by disengaging the catch members, the sockets and the stakes associated therewith at either or both sides of the machine may be tilted until the stakes extend rearwardly from the frame; if desired, to such an extent as to drag upon the ground.

Suitably associated with the rear axle of the machine are longitudinally slidable rods 36 provided at their rear ends with eyes 37, and at their front ends with heads 38 between which and the rear axle springs 39 are interposed to normally project the rods in a forward direction. The eyes 37 of the rods 36 are connected by flexible members, such as chains 40, with the rear end of the bottom member B, said chains and spring actuated bolts coöperating with the similar devices at the front end of the bottom member to limit the movement of the said bottom member in a rearward direction. In addition, the springs 30 and 39 serve to assist in projecting the bottom member in a forward direction to restore it to its initial and normal position after the discharge of the load.

Suitably secured upon the outer faces of the sills 1 of the machine are keepers 41, some of which are provided with vertical apertures 42 for the passage of U-shaped hangers or brackets 43, which latter may be vertically adjusted and may be retained at various adjustments by set screws 44 or other suitable means. The keepers having the adjustable hangers or brackets 43 are situated in rear of the front wheels and in rear of the rear wheels of the machine, and said hangers or brackets serve to support the outer ends of the cutter bars 45 carrying knives or cutting blades 46, the inner ends of said cutter bars being supported in hangers 47 associated with the front and rear axles, respectively.

When the machine is not needed for use as a corn harvester it may be quickly converted into an efficient and useful farm wagon or dumping wagon by simply placing in position suitable sideboards 48 equipped with stakes 49 to engage the keepers 41 on the outer faces of the side sills, said sideboards being directly supported upon the upper faces of the sills. The front ends of the sideboards are introduced between the cleats 15, 16 upon the dashboard at the front end of the frame, and said sideboards will thereby be materially reinforced and prevented from spreading. A tail board or end gate 50 is also provided, the same being suitably connected with the rear ends of the sideboards, preferably in such a manner as to prevent the latter from spreading. It will thus be seen that by simply providing suitable sideboards and an end gate the machine when not needed as a corn harvester may be utilized as a farm wagon for the purpose of hauling material or produce of all kinds. It is also obvious that when thus used, the bottom member or platform will be retained in proper position for operation by the stakes or uprights 34 engaging the projecting ends or brackets 24 of the cross bar 23 at the rear end of the platform.

In the operation of this machine as a corn harvester the operator takes his stand upon the projecting end of the knife carrying cutter bar in rear of the front wheel, the cutting device adjacent to the rear wheel being at the time retracted beneath the platform. As the corn stalks are being severed by the knife they are grasped by the operator and piled transversely upon the platform in rear of the dash board until half a load has been accumulated. The front cutting device is now retracted, and the rear cutting device is projected to provide a stand for the operator who now proceeds with the operation, piling the stalks in front of the stakes or uprights 34 until a load has been accumulated. The load may now be immediately discharged upon the ground, or it may be carried to a place at a distance and there discharged. In order to discharge the load it is only necessary to disengage the catches 35 from the sockets 33, thus permitting the stakes or uprights 34 to swing or tilt rearwardly. The stakes being thus moved to a non-obstructing position with reference to the brackets 24 associated with the platform or bottom member B, the latter will slide or move downwardly upon the rearwardly and downwardly inclined truck frame until the chains or flexible connecting members 32 and 40 and the springs 30 and 39 are placed under tension, the platform being obviously tilted by gravity when more than half of its length is projected rearwardly of the truck frame. The load will slide freely from the platform on to the ground, and the platform or bottom member will now be started in a forward direction by the action of the springs 30 and 39, the movement being assisted by the operator who, when the platform has been restored to its initial or normal position, restores the pivoted socket member or members at one or both sides of the machine to engagement with the catch 35, whereby the stake or upright 34 will be held in an obstructing position with reference to the bracket or brackets 24 of the platform. It is desired to be understood that when a single row of corn is being operated upon only the stake 34 at the side near the operator need be maintained in an obstructing position with reference to the platform, the other or opposite stake being permitted to trail in a rearward direction, thus obviating the necessity of the operator going from one side of the machine to the other in order to discharge the load. The stakes 34 also constitute skids or guides over which the load will be easily discharged without danger of becoming tangled.

When the device is equipped with the sideboards and the end gate to be used as a wagon, the bottom member or platform is retained in position to constitute the bottom of the wagon bed by means of the upright stakes 34. To unload the wagon it will be only necessary to remove the end gate and to release the sockets 33 from the catch members 35 when the stakes 34 may be tilted to a non-obstructing position, and the bottom carrying the load will slide downwardly and rearwardly until the projecting end is tripped or tilted by the weight of the load which will thus be quickly and effectively discharged, after which the bottom member will be restored to its initial position.

It may be stated that the spring actuated rods 27 and 36 are preferably threaded for the reception of the heads 29 and 38, respectively, which may then be adjusted for the purpose of regulating the tension of the springs when desired.

As will be seen from the foregoing description, taken in connection with the drawings hereto annexed, I have provided a corn harvester of simple and improved construction which may be manufactured at a very moderate expense and which when not in present use as a harvesting machine may be quickly and inexpensively converted into a durable and useful farm wagon which is, moreover, constructed in such a manner as to permit the load to be dumped.

It is evident that when the device is used as a wagon, the cutting devices are to be detached, enabling them to be stored in some place where the blades will be properly protected.

Having thus described the invention, what is claimed as new, is:—

1. In a corn harvester, a truck frame including a dashboard, spring projected rods extending through the dashboard and having eyes at their rear ends, a longitudinally slidable platform supported on said truck frame, and flexible elements connecting the platform with the spring projected rods.

2. In a corn harvester, a downwardly and rearwardly inclined truck frame including side sills, a platform supported slidably upon the truck frame and having a cross bar projecting to form laterally extending brackets, socket members pivoted upon the side sills and having stakes adapted to extend upwardly in the path of the brackets, and catch means engaging the socket members to retain the same in adjusted position with the stakes directed upwardly.

3. In a corn harvester, an inclined truck frame having anti-friction rollers, a longitudinally slidable platform having laterally extending brackets, pivotally supported obstructing members lying in the path of said brackets, and resilient catches engaging the pivoted obstructing members to retain said members in obstructing position.

4. An inclined truck frame, a platform supported slidably thereon and having laterally extending brackets, means including retracting springs to limit the movement of the platform upon the inclined truck frame, pivotally supported obstructing members adapted to lie in the path of the brackets upon the platform, and resilient catch members engaging the pivoted obstructing members to maintain the latter in obstructing position.

5. In a corn harvester, an inclined truck frame, a dash board upon said frame, pairs of cleats secured on said dash board, a platform slidably supported upon the truck frame, means for securing said platform in retracted position, means associated with the dashboard and including retracting springs for limiting the rearward movement of the platform, sideboards adapted to be supported upon the truck frame in engagement with the pairs of cleats on the dash board, and an end gate associated with said sideboards.

In testimony whereof I affix my signature in presence of two witnesses.

EMMETT T. COX.

Witnesses:
WM. BAGGER,
H. DITTMAN.